Feb. 11, 1930.  A. DINA  1,746,385
FRAMING MECHANISM FOR CINEMATOGRAPHIC PROJECTORS
Original Filed May 19, 1925   3 Sheets-Sheet 1

INVENTOR
Augusto Dina
BY
ATTORNEY.

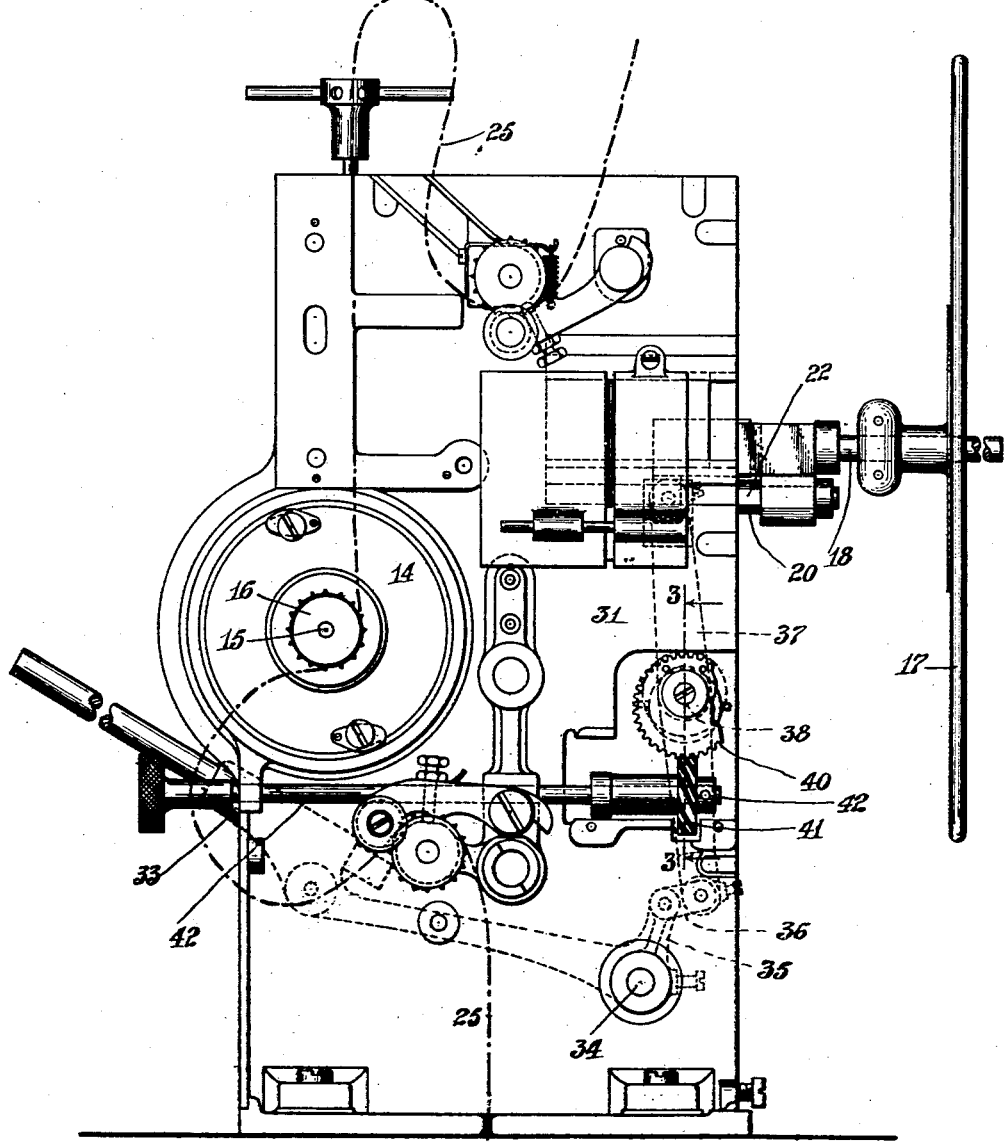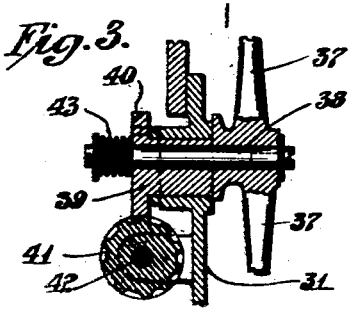

Feb. 11, 1930. A. DINA 1,746,385
FRAMING MECHANISM FOR CINEMATOGRAPHIC PROJECTORS
Original Filed May 19, 1925   3 Sheets-Sheet 3

Patented Feb. 11, 1930

1,746,385

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

FRAMING MECHANISM FOR CINEMATOGRAPHIC PROJECTORS

Application filed May 19, 1925, Serial No. 31,415. Renewed June 27, 1929.

My invention relates to framing mechanisms for cinematographic projectors, and more particularly to a framing mechanism which may be so actuated as to cause simultaneous adjustment of the film feeding mechanism and of the shutter, or an independent adjustment of the shutter when the film itself is properly framed, but the shutter is so set as to have the timing of the interruption of the light rays by its cover blade, out of synchronism with the timing of the feed interval of the film.

When using cinematographic projectors, pictures frequently get out of frame, owing to slight variations in the length of a film through shrinkage, or to imperfect splicing after breakage of the film. Furthermore, in threading the film through the machine, or in assembling the different parts of the machine, there may be an improper positioning of the film or of the shutter, which requires correction by mechanisms in the machine.

Heretofore it has been a common practice to provide framing mechanisms by which either the film feeding mechanism or the shutter may be independently adjusted, and also provided a mechanism by which both the film feeding mechanism and the shutter may be simultaneously adjusted and to the same extent. In such mechanisms, however, these conditions have not been taken into account, by which the simultaneous adjustment of the film feeding mechanism and of the shutter is sometimes made desirable, while at other times, the adjustment of the shutter only is necessary.

Conditions requiring simultaneous adjustment of the film feeding mechanism and the shutter are more frequently encountered than are the conditions requiring only adjustment of the shutter. All these conditions are the result of accumulated error, since a very slight error in the actuating mechanism for the shutter or in the film becomes exaggerated in a machine, the speed of which is usually about one thousand revolutions per minute.

With the above conditions in mind, I have provided a framing mechanism so constructed that it may be either so actuated by means of a single control lever, as to simultaneously actuate the film feeding sprocket to advance or retard the film and the actuating mechanism for the shutter, to retard or advance its cover blade in about the same ratio as the film itself is advanced or retarded, or by means of an independent control operative upon that portion of said mechanism controlling the actuating mechanism for the shutter, so as to actuate the shutter independently of the feed sprocket, thus permitting the relation of the blade of the shutter to the sight-aperture, or opening in the framing plate, to be controlled entirely independently of any adjustment of the film feeding mechanism.

The framing movement of the film, while accomplished through the medium of the intermittent mechanism, results from a movement of the feed sprocket entirely independently of the normal operation of the parts of the intermittent mechanism thereon, or, in other words, with relying upon a relative change in the position of the parts of the Geneva movement since a change in the relative position of such parts will not influence the quantity of film fed, but merely the timing of the feeding interval which of itself will not correct a loss in the framing of the picture. In fact, the construction of this intermittent mechanism is such that the relation of the cooperating members of the Geneva stop movement will be automatically readjusted during the framing movement of the sprocket so as not to disturb the timing in the normal feeding movement of the film.

The present invention, it will be understood, is characterized by the provision of an improved film feeding and framing mechanism; the provision of an improved framing mechanism and shutter adjusting mechanism; the provision of improved film feed and framing mechanisms and a shutter and means for independently adjusting such mechanisms; the provision of an apparatus of the character described including a shutter, a film feeding sprocket, and means for imparting a partial rotation to said shutter independently of or simultaneously with said sprocket, for framing the picture projected from the film and for synchronizing the shutter; the provision of a framing and shutter mechanism characterized by the presence of a gear train including epicyclic gears; and the provision of a framing mechanism wherein the shutter may be advanced or retarded with the framing operation or independently thereof.

The foregoing and such other objects and advantages as may appear or be pointed out as this description proceeds are attained in the structural embodiment of this invention, illustrated in the accompanying drawings; in which:

Figure 2 is a view of said mechanism from the other side of said plate; and

Figure 3 is a section on the line 3—3 of Figure 2.

Like numerals refer to like parts throughout the several views.

Figure 1:
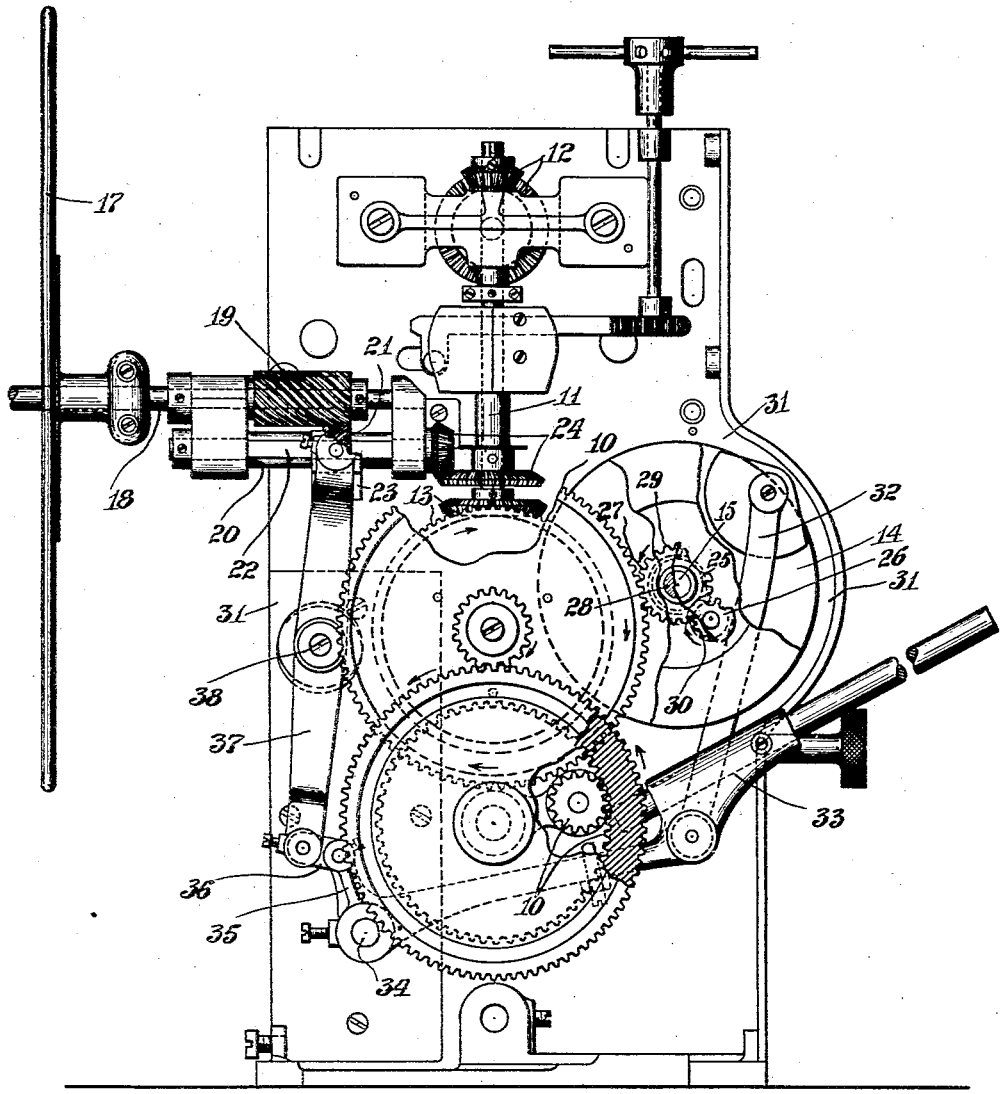
Figure 1 is a view of the film feeding and framing mechanism at one side of the main plate supporting same.

While the particular construction of the main mechanisms of the machine is immaterial to my present invention, I have illustrated this invention in connection with a well known construction of projectors and will describe it in connection with this mechanism omitting all reference, however, to all parts of the machine excepting those incidental to the actuation of the film and the shutter.

In the accompanying drawings, the main driving gear train is shown at 10, by which gear train a shaft 11 is driven for transmitting power to the gears 12 actuating the upper film feeding sprocket. Said shaft 11 is driven by intermeshing gears 13, one of which forms a part of the main driving gear train and the other of which is carried by the shaft 11.

The oil box, containing an old and well known form of Geneva stop movement, is shown at 14, the Geneva gear of which has a shaft 15 carrying the intermittent feed sprocket 16. These mechanisms are old and well known in this art, and a further description thereof is therefore unnecessary except that the oil box 14 is rotatable about the axis of the shaft 15, so that by rotating this oil box in one direction or the other, both cooperating members of the Geneva stop movement will also be turned about the axis of this shaft and will have the effect of turning the shaft as a result of the engagement of the Geneva gear and the single tooth gear cooperating therewith, and that this movement may be imparted to the oil box and to the sprocket wheel 16 without interfering with the timing of the normal functioning of the Geneva stop movement or varying its operative effect as to the quantity of film fed with each actuation of the Geneva gear forming a part of this movement.

In combination with the film feeding mechanism is a rotating shutter including therein a cover blade and one or more flicker or anti-flicker blades cooperating with a framing aperture or sight-opening plate positioned in front of the lens housing not shown in the drawings. This general arrangement is well known in this art, and a detailed description is therefore unnecessary, it being merely necessary to set forth that the cover blade of the shutter is set in relation to the sight opening or aperture in the framing plate, so as to time the interception of the light rays passing to the screen with relation to the feeding movements of the film, so as to avoid the formation of what is generally known as ghosts or light streaks in the reproduction on the screen.

In the accompanying drawings the shutter is shown at 17; this shutter is rotated by a shaft 18 carrying a skew or spiral gear 19, through which the shaft is driven. Extending counter to the shaft 18 is a shaft 20 having a skew or spiral gear 21 in mesh with the gear 19 slidably mounted thereon as by means of a feather or splint not shown. Mounted upon suitable guide rods 22 upon opposite sides of the shaft 20 is a forked block 23 straddling the gear 21, and engaging the opposite faces thereof in a manner to permit movement of said gear longitudinally of the shaft 20 by said block.

The shaft 20 is driven by means of the intermeshing gears 24 carried respectively by the shaft 11 and said shaft 20.

In securing the proper framing of a picture it may be necessary to advance or retard the film indicated at 25 entirely independently of its movement as a result of the actuation of the sprocket wheel 15 through the normal functioning of the Geneva stop movement, while at the same time readjusting the position of the cover blade of the shutter with relation to the aperture or sight opening of the framing plate, by a movement of said blade in a direction opposite to that of the film. Under some conditions, however, a movement of the film is required where no readjustment of the cover blade is necessary, while in other instances a readjustment of the cover blade of the shutter is necessary to avoid ghosts or streaks in the reproduction while the film itself is properly framed.

To meet all of the above conditions, I provide a mechanism having two independent controls, one of which is operative solely upon the portion of the mechanism operative for adjusting the shutter while the other is operative upon this mechanism as well as upon the oil box 14 for imparting an advance or return feeding movement to the intermittent sprocket. While these controls are independently operative, they nevertheless act through the same mechanism, one of these controls therefore being capable of modifying the operative effect of the other as to the shutter actuating mechanism, and in effect permitting the other control to be utilized either for simultaneously adjusting the shutter actuating mechanism and the oil box, or of actuating only the oil box.

Furthermore, this mechanism is so constructed that whatever the adjustment of the mechanism operative upon the shutter may be, the operative effect of the mechanism operative upon the oil box upon this shutter actuating mechanism will always be the same.

The intermittent mechanism shown in Figure 1 of the drawings is an oil and well known type consisting of a Geneva gear 25 and its cooperating single toothed gear 26. The gear 25 is carried by the shaft 15 which is mounted centrally of the oil box 14 while the cooperating gear 26 is mounted eccentrically of said box. The gear 26 is actuated by a gear 27 exteriorly of the box and carried by the shaft 28, which shaft also carries a gear 29 meshing with a gear 30 upon the shaft of the single toothed gear 26. The oil box 14 in its entirety is mounted in a suitable bearing opening in the frame 31, which frame supports the various mechanisms of the machine. The oil box 14 is adapted to receive a rotary movement by means of a link 32 pivoted thereto at one end and to a main controlling lever 33 at the other end. The lever 33 is pivoted at 34 and is provided with a crank 35 through which the gear 21 is moved in a manner to impart rotary movement to the gear 19 by reason of the spiral arrangement of the teeth upon these gears, independently of rotary movement of said gear 21.

The crank 35 is connected by means of a short link 36 with a rocking lever 37 pivoted upon a shaft 38 at a point substantially midway between the ends of said lever. The other end of the lever 37 is pivotally connected with the slide block 23 acting upon the gear 21.

From the foregoing it will be observed that downward movement of the lever 33 which will result in retardation in the feeding movement of the film by the sprocket 16, will cause a corresponding acceleration in the rotary movement of the shutter 17, while on the other hand an upward movement of said lever 33, causing acceleration, or advance, of the film in its movement will cause a corresponding retardation in the movement of the shutter 17 so that movement of said lever 33 causing any change in the operative effect of the intermittent sprocket contrary to its normal actuating under the intermittent mechanism, will cause a corresponding adjustment of the relation of the cover blade to the aperture of the framing plate.

The shaft 38 is mounted eccentrically in a bushing 39, which bushing is revolubly mounted in the frame 31 of the machine, and carries a skew or worm gear 40 in mesh with a skew or worm gear 41 carried by the controlling shaft 42. The shaft 38 is acted upon by a spring 43 disposed about said shaft and between a washer 43ª upon said shaft and the bushing 39, thus tending to maintain the lever 37 and gear 40 in intimate contact with said bushing.

It is apparent that rotation of the bushing 39 in one direction or the other will impart eccentric movement to the shaft 38 so as to angularly displace the lever 37 about its point of pivotal connection with the link 36, without disturbing the operative relation of the crank 35 and the lever 33 actuating same, thus sliding the gear 21 relatively to the gear 19 and imparting a partial rotation to the shutter 17 to advance or retard the latter as required.

The operation of the herein described mechanism is substantially as follows:—

I have heretofore referred to the acceleration or advance of the film, or of its retardation, and the corresponding movement of the shutter 17. These expressions are in fact accurate so long as adjustment for framing is accomplished while the machine is in operation, which is the ordinary condition. Where the word "acceleration" is employed, this term means lineal movement of the film during a single cycle of operations of the intermittent mechanism or a sequence of such operations in excess of the movement of the film as a result of the actuating of the intermittent sprocket by this mechanism, although the actual excess movement of the film may occur only when the intermittent mechanism is inoperative to impart movement thereto. In using the word "retardation", the reverse of the above is meant. Either effect, however, may be secured in part while the intermittent mechanism is imparting feeding movement to the film.

In order to make the operation of the framing mechanism heretofore described perfectly clear, the actuation of the ordinary so-called intermittent mechanism and the actuation of this mechanism for securing acceleration and retardation of the film will first be described, notwithstanding that such is old and well known in the art.

Under normal conditions, a four toothed Geneva gear 25 is employed so that the intermittent sprocket 16 will receive four feeding movements with each complete rotation of the shaft 15 carrying same and said Geneva gear. The single toothed gear 26 therefore imparts one quick feeding impulse to the Geneva gear and the intermittent sprocket with each rotation of this single toothed gear, these cooperating gears, except during this short feeding interval, holding the intermittent sprocket 16 against movement in the usual manner. Since the single toothed gear 26 is driven by a gear train, including an epicyclic couple, that is, the driving gear 29, is concentric with the shaft 15, and the driven gear 30 is eccentric to said shaft and carried by a shaft movable about the axis of the shaft 15, it is apparent that movement of said driven gear 30 and said single toothed gear 26 about the axis of the intermittent sprocket 16 will not only impart movement to said sprocket through the Geneva gear carried thereby, but will do this irrespective of the cooperating relation between the tooth of the single toothed gear, and said Geneva gear. By reason of the planetary movement of the driven gear 30 about the driving gear 29, the operative relation of this single tooth to the Geneva gear will be so varied that if the movement of the film be an accelerated movement, the engagement of the cooperating members of the Geneva gear will be retarded to approximately a corresponding extent, or if it results in the retardation of the film, that the cooperating engagement of these gears will be correspondingly accelerated. In this manner, there will be no change in the timing of the film feed mechanism as to other mechanisms in the projector as a result of its actuation for framing purposes and consequently there will be no variation in the film loops upon opposite sides of the film feeding mechanism.

It is apparent that if the speed of the gear 30 in its planetary movement coincides with the speed of the driving gear 29, and is in the same direction as the direction of rotation of said driving gear, the relation of the gears 25 and 26 will not be changed, this, however, being equivalent to the retardation of the operative engagement of the tooth of the gear 26 with the Geneva gear 25 as compared with the timing as to other and continuously moving mechanisms in the machine. These conditions are those which require the adjustment of the shutter 17 with relation to the aperture plate simultaneously with the acceleration or retardation of the film, but in the reverse direction.

The setting of the cover blade of the shutter 17 is determined by the time of the initial engagement of the single tooth of the gear 26 with the Geneva gear 25, and the working conditions in the machine require this engagement to be at a time when a full picture is exposed through the aperture framing plate. Therefore, the operation of framing involves the three phases; the movement of the sprocket otherwise than by the normal functioning of the intermittent mechanism; the readjustment of the gears of the Geneva stop movement so as to preserve accuracy in the timing of this movement with relation to other mechanisms in the machine; and lastly, the readjustment of the shutter so as to maintain the necessary fixed relation between its cover blade and the single tooth of the gear 26 so as to preserve a proper timing of the shutter, as to the intermittent feeding movement of the film.

In a machine embodying my invention, the above mode of operation is present, the mechanism herein shown and described being employed for the purpose of permitting a rapid and positive movement of the oil box resulting in the operation above described, and also a rapid and positive movement of the lever 37 when conditions are such as also to require the acceleration or retardation of the cover blade of the shutter 17 in synchronism with the movement of the film.

If the film is so out of frame as to require the acceleration, the controlling lever 33 is raised, thus actuating the link 32 in a manner to move the oil box 14, the Geneva gears 25 and 26, the shaft 15 and the intermittent sprocket 16 clockwise, Figure 1. Since this movement of the sprocket 16 will draw the film 25 downwardly of the opening, it is apparent that the gear 30 will be moving with the gear 29 so that even if the single tooth of the gear 26 be engaged with the Geneva gear 25, the rotation of this gear 26 will be entirely stopped or retarded according to the speed of movement of the lever 33. In this event, rotary movement of the sprocket 16 will be neither wholly nor in part as a result of the movement of the gear 26 with relation to the Geneva gear 25.

Actual framing will ordinarily require an elapsed time sufficient to permit the passage of a number of pictures by the projecting lens so that a single cycle of operations of the intermittent mechanism cannot be used as a standard in discussing the operation of this framing mechanism. It is apparent, however, that since the timing of the feeding of the film determines the length of film fed during a given interval, the result of retardation in the initiation of succeeding feeding movements as a result of the planetary movement of one gear about another, while the film is actually being advanced by mechanisms independent of this gearing and its normal function of feeding the film, will be to compensate for the excess feeding movement of the film so as to preserve accuracy in the timing of the feeding of the film while at the same time permitting that actual shifting of the film independently of the normal functions of the intermittent mechanism, essential to secure readjustment for framing purposes.

By moving the lever 33 downwardly, all of the operations above referred to will be the reverse of those described immediately above, the feeding movement of the sprocket 16 being contraclockwise, Figure 2, and the movement of the gear 30 being counter to that of the driving gear 29 so that the single tooth of the gear 26 will be advanced in relation to the Geneva gear 25, and thus advance the succeeding feeding movements of said gears, and thus compensate for the slight decrease in the quantity of film fed as a result of the contraclockwise movement of the sprocket 16.

Irrespective of the direction of movement of the lever 33, the crank 35 carried by said lever will oscillate the lever 37 about the fulcrum afforded by the shaft 38. With an upward movement of the lever, with its incidental acceleration of the film, the spiral or skew gear 21 will be forced toward the shaft 11 and moved along its cooperating spiral or skew gear 19, thus increasing momentarily the speed of said gear 19 and the shaft 18 provided both gears are rotating, which is ordinarily the condition. If, on the contrary, the lever 33 is moved downwardly, the rocking lever 37 will be moved in the opposite direction as will also the gear 21, with the effect of momentarily lowering the speed of the gear 19. The movement of the lever 37 first above referred to will have the effect of advancing the cover blade of the shutter 17 in practically the same ratio that the film itself is retarded while movement of the gear 21 in the reverse direction will have the effect of retarding the cover blade of the shutter 17 with the acceleration of the film.

While under ordinary running conditions this simultaneous but reverse adjustment of the film and of the shutter is ordinarily all that is required when framing, nevertheless, conditions may arise when it is desired to actuate the film feeding mechanism, or the shutter 17, one entirely independently of the other, which can be done only as a result of an independent adjustment of the shutter 17. In fact that adjustment of the shutter 17 is largely a matter for the elimination of ghosts, and does not bear any definite relation to the framing of the picture, except the desired retardation to secure better lighting effects which cannot be done with a shutter which is not accurately timed with relation to the film. It is also desirable, when the shutter 17 is adjusted independently of the controlling lever 33, that this adjustment shall not interfere with the operative relations between said lever and the rocking lever 37 so as to disturb the relation of the gears 25 and 26 and result in a loss in synchronism between the movement of the shutter and of the film through the movement of said lever 33.

Hence the adjustment of the shutter 17 is accomplished by shifting the shaft or fulcrum point 38 of the lever, which will impart the desired movement to the shutter 17 without varying the operative relation of the lower arm of said lever with the crank 35. The pivoted link 36 will permit the slight vertical movement of the lever in its entirety, resulting from the shifting of the shaft 38 as a result of the rotation of the bushing 39 by means of the gears 40 and 41 and the controlling shaft 42. The bushing 39 may be turned in either direction, according to whether it is desired to advance or retard the cover blade of the shutter 17. If the bushing is turned clockwise, Figure 2, the result will be a retardation of the shutter. If it is turned contraclockwise, the result will be an acceleration or advance of the shutter. Therefore, the lever 33 or the shaft 42 may be actuated while the machine is in operation, although the actuation of the lever 37 by the shaft 42 and the operative connections between said shaft and the fulcrum shaft of said lever are usually employed when setting up a machine.

Figure 4:
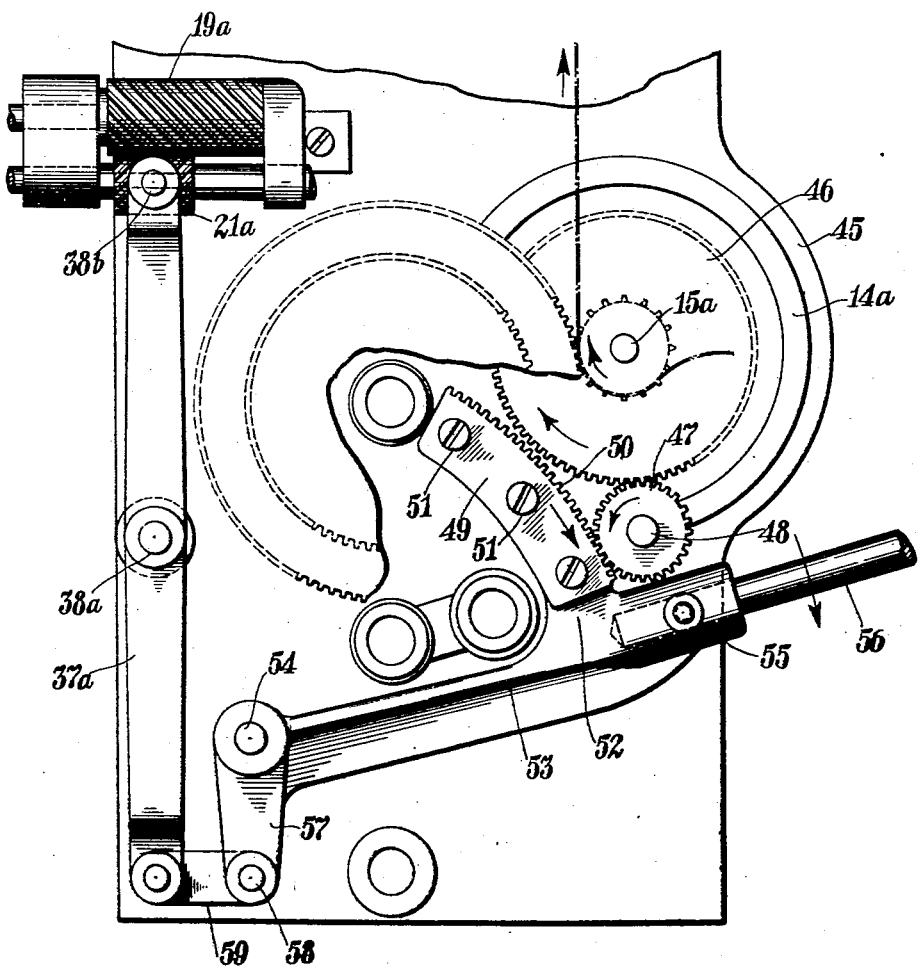
Figure 4 is alternative form of the device of this invention.

Referring now to the device of Figure 4, a part of the frame is shown at 45 upon which the oil box 14ª is rotatably mounted about a shaft 15ª, the oil box and said shaft being rotated by the alternative form of this invention which includes a gear 46 mounted upon the shaft 15ª and meshing with an idler pinion 47 rotatably mounted on a shaft 48 secured to a frame 45 of the machine.

Motion is imparted to the pinion 47 by the provision of a segment 49 having its teeth 50 meshing with said pinion, said segment 49 being fixedly mounted, by the provision of screws 51, upon an arcuate laterally extending arm 52 integrally formed on the actuating lever 53. The actuating lever 53 is mounted at its inner end upon a fulcrum 54, and at its outer end is provided with a socket 55 for receiving an actuating handle 56 by which said lever 53 may be manipulated about its fulcrum to displace the segment 49 and thus impart rotation to the pinion 47 and gear 46. This operation serves to rotate the oil box and the parts of the Geneva gear movement contained therein for framing the picture.

The lever 53 is provided with a downwardly extending lug 57, which is pivotally connected to the lower end of the oscillatable lever 37ª which latter corresponds to the lever 37 shown in Figure 1 and is mounted on a fulcrum 38ª.

The lever 37ª performs the operation of synchronizing the shutter and is connected at 38ᵇ to the spiral pinion 21ª, which in turn imparts a partial rotation to the worm 19ª mounted on the shutter shaft.

Having thus described my invention and illustrated its use, what I claim as new and desire to secure by Letters Patent is:

1. In a motion picture projector, the combination of a framing device and a shutter, a film feeding sprocket, an intermittent couple for driving said sprocket, means for displacing said intermittent couple for framing the picture, a gear train for operating said shutter, means for relatively moving a pair of the gears of said train for imparting a partial rotation to said shutter, and means including relatively movable links one of which is pivoted between its ends on a displaceable fulcrum for displacing said gears.

2. In a motion picture projector, the combination of a framing device and a shutter, a film feeding sprocket, an intermittent couple for driving said sprocket, means for displacing said intermittent couple for framing the picture, a gear train for operating said shutter, means for relatively moving a pair of the gears of said train for imparting a partial rotation to said shutter, means including relatively movable links for imparting partial rotation to said shutter, said links being connected to said framing device, one of said links being pivoted between its ends on a displaceable fulcrum, and means for relatively displacing said fulcrum and link without disturbing said framing device, for independently imparting a partial rotation to the shutter.

3. In a motion picture projector, the combination of a framing device and a shutter, a film feeding sprocket, an intermittent couple for driving said sprocket, a gear train for driving said shutter and including at least two spiral gears, a lever for supporting one of said gears pivoted between its ends on a displaceable fulcrum, and means for moving said lever for relatively shifting said gears.

4. In a motion picture projector, the combination of a framing device and a shutter, a film feeding sprocket, an intermittent couple for driving said sprocket, a gear train for driving said shutter and including at least two spiral gears, a lever for supporting one of said gears, a displaceable fulcrum for said lever at its medial portion, and means for displacing said fulcrum for moving the lever and thereby relatively displacing said gears.

5. A framing mechanism for cinematographic projectors embodying therein a film feeding sprocket, an intermittent mechanism operative upon said sprocket, means whereby cooperating parts of said mechanism are permitted to rotate about the axis of, and with, said sprocket, a shutter including a cover and a flicker blade, a shaft carrying said shutter, a gear carried by said shaft, a shaft counter to said first named shaft, a gear rotatable therewith and slidably mounted thereon, meshing with said other gear, a rocking lever, a pivotal support intermediate the ends of said lever on which the latter is permanently fulcrumed, one arm of which is operative upon said last named gear, a controlling lever, connections between said controlling lever and said first named means, means imparting movement to said pivotal support toward and from said shutter to impart movement to said rocking lever independently of said controlling lever, and an actuating mechanism operative upon said intermittent mechanism and the shaft for said slidable gear.

6. A framing mechanism for cinematographic projectors embodying therein a film feeding sprocket, an intermittent mechanism operative upon said sprocket, means whereby cooperating parts of said mechanism are permitted to rotate about the axis of, and with, said sprocket, a shutter including a cover and a flicker blade, a shaft carrying said shutter, a gear carried by said shaft, a shaft counter to said first named shaft, a gear rotatable therewith and slidably mounted thereon, meshing with said other gear, a rocking lever, one arm of which is operative upon said last named gear, a rotatably mounted bushing, a pivot mounted eccentrically of said bushing and serving as a fulcrum for said lever intermediate its ends, a controlling lever, connections between said controlling and said rocking lever, connections between said controlling lever and said first named means, means operative upon said bushing, whereby it may be rotated to impart movement to said pivot toward and from said shutter, and corresponding movement to said rocking lever independently of said controlling lever, and an actuating mechanism operative upon said intermittent mechanism and the shaft for said slidable gear.

7. A framing mechanism for cinematographic projectors embodying therein a film feeding sprocket, an intermitent mechanism operative upon said sprocket, means whereby cooperating parts of said mechanism are permitted to rotate about the axis of, and with, said sprocket, a shutter including a cover and a flicker blade, a shaft carrying said shutter, a gear carried by said shaft, a shaft counter to said first named shaft, a gear rotatable therewith and slidably mounted thereon, meshing with said other gear, a rocking lever, one arm of which is operative upon said last named gear, a rotatably mounted bushing, a pivot mounted eccentrically of said bushing and serving as a fulcrum for said lever intermediate its ends, a controlling lever, connections between said controlling and said rocking lever, connections between said controlling lever and said first named means, a controlling shaft, intermeshing gears carried thereby and by said bushing, whereby it may be rotated to impart movement to said pivot toward and from said shutter, and corresponding movement to said rocking lever independently of said controlling lever, and an actuating mechanism operative upon said intermittent mechanism and the shaft for said slidable gear.

8. A framing mechanism for cinematographic projectors embodying therein a rotatable oil box, a shaft mounted concentrically thereof, an intermittent feeding sprocket and a Geneva stop gear carried by said shaft, a single toothed gear cooperating with said Geneva stop gear and mounted eccentrically of said oil box, a driving gear concentric with said first named shaft, a gear meshing therewith and rotating said single toothed gear, a shutter including a cover and a flicker blade, a shaft carrying said shutter, a gear carried by said shaft, a shaft counter to said first named shaft, a gear rotatable therewith and slidably mounted thereon meshing with said other gear, a rocking lever, one arm of which is operative upon said last named gear, a controlling lever, a link connecting said controlling lever with said oil box, connections between said controlling lever and said rocking lever, and an actuating mechanism operative upon said driving gear and the shaft for said slidable gear.

9. A framing mechanism for cinematographic projectors embodying therein a rotatable oil box, a shaft mounted concentrically thereof, an intermittent feeding sprocket and a Geneva stop gear carried by said shaft, a single toothed gear cooperating with said Geneva stop gear and mounted eccentrically of said oil box, a driving gear concentric with said first named shaft, a gear meshing therewith and rotating said single toothed gear, a shutter including a cover and a flicker blade, a shaft carrying said shutter, a gear carried by said shaft, a shaft counter to said first named shaft, a gear rotatable therewith and slidably mounted thereon, meshing with said other gear, a rocking lever, one arm of which is operative upon said last named gear, a rotatably mounted bushing, a pivot mounted eccentrically of said bushing and serving as a fulcrum for said lever intermediate its ends, a controlling lever, connections between said controlling and said rocking lever, a controlling shaft, intermeshing gears carried thereby and by said bushing, whereby it may be rotated to impart movement to said pivot toward and from said shutter, and corresponding movement to said rocking lever independently of said controlling lever, a link connecting said controlling lever with said oil box, and an actuating mechanism operative upon said driving gear and the shaft for said slidable gear.

10. A framing mechanism for cinematographic projectors embodying therein a rotatable oil box, a shaft mounted concentrically thereof, an intermittent feeding sprocket and a Geneva stop gear carried by said shaft, a single toothed gear cooperating with said Geneva stop gear and mounted eccentrically of said oil box, a driving gear concentric with said first named shaft, a gear meshing therewith and rotating said single toothed gear, a shutter including a cover and a flicker blade, a shaft carrying said shutter, a gear carried by said shaft, a shaft counter to said first named shaft, a gear rotatable therewith and slidably mounted thereon meshing with said other gear, a rocking lever, one arm of which is operative upon said last named gear, a controlling lever, a link connecting said controlling lever with said oil box, connections between said controlling lever and said rocking lever, a gear train operative upon said driving gear, a shaft driven from said gear train, and intermeshing gears connecting said last named shaft with the shaft carrying said shutter, whereby movement of said sprocket wheel to advance or retard a film will cause a simultaneous retarding or advancing movement of the shutter.

11. In a motion picture projector, the combination of a framing device and a shutter, a film feeding sprocket, a gear train for driving said shutter and including two spiral gears relatively movable along fixed axes, an epicyclic gear train for driving said sprocket and having a rotatable member for imparting movement to the sprocket, a lever pivoted intermediate its ends on a shiftable fulcrum for imparting relative movement to said spiral gears, a manually operated lever pivoted below the fulcrum of said first named lever and operatively connected to one end thereof, and a connection between said manually operable lever and said rotatable member whereby simultaneous movement will be imparted to the latter and to said spiral gears.

In testimony whereof I have hereunto affixed my signature this 5th day of December, A. D. 1924.

AUGUSTO DINA.